United States Patent
Kriech et al.

(10) Patent No.: US 10,435,850 B1
(45) Date of Patent: *Oct. 8, 2019

(54) VOID REDUCING ASPHALT MEMBRANE COMPOSITION, METHOD AND APPARATUS FOR ASPHALT PAVING APPLICATIONS

(71) Applicant: Heritage Research Group, Indianapolis, IN (US)

(72) Inventors: Anthony J. Kriech, Indianapolis, IN (US); Herbert L. Wissel, Indianapolis, IN (US); Timothy P. Reece, Indianapolis, IN (US); Marvin Keller Exline, Terre Haute, IN (US)

(73) Assignee: Heritage Research Group, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,550

(22) Filed: Jun. 26, 2019

Related U.S. Application Data

(63) Continuation of application No. 16/276,214, filed on Feb. 14, 2019, now Pat. No. 10,364,535, which is a continuation of application No. 16/103,466, filed on Aug. 14, 2018, which is a continuation of application No. 15/646,912, filed on Jul. 11, 2017, now Pat. No. 10,060,080, which is a continuation of application No. 15/401,995, filed on Jan. 9, 2017, now Pat. No. 9,739,018, which is a continuation of application No. 15/064,819, filed on Mar. 9, 2016, now Pat. No. 9,732,478.

(60) Provisional application No. 62/302,335, filed on Mar. 2, 2016, provisional application No. 62/130,293, filed on Mar. 9, 2015.

(51) Int. Cl.

| | |
|---|---|
| *E01C 7/00* | (2006.01) |
| *E01C 11/02* | (2006.01) |
| *E01C 7/18* | (2006.01) |
| *C08K 3/013* | (2018.01) |
| *E01C 11/24* | (2006.01) |
| *E01C 7/30* | (2006.01) |
| *C08K 5/09* | (2006.01) |
| *C08K 3/36* | (2006.01) |
| *E01C 7/32* | (2006.01) |
| *C08L 91/06* | (2006.01) |
| *C08L 93/00* | (2006.01) |
| *C08L 95/00* | (2006.01) |
| *C08L 101/12* | (2006.01) |
| *C08K 3/22* | (2006.01) |

(52) U.S. Cl.
CPC .............. *E01C 11/02* (2013.01); *C08K 3/013* (2018.01); *C08K 3/36* (2013.01); *C08K 5/09* (2013.01); *C08L 91/06* (2013.01); *C08L 93/00* (2013.01); *C08L 95/00* (2013.01); *C08L 101/12* (2013.01); *E01C 7/18* (2013.01); *E01C 7/185* (2013.01); *E01C 7/30* (2013.01); *E01C 7/32* (2013.01); *E01C 7/325* (2013.01); *E01C 11/24* (2013.01); *C08K 2003/2227* (2013.01); *C08L 2555/50* (2013.01); *C08L 2555/60* (2013.01); *C08L 2555/80* (2013.01); *C08L 2555/84* (2013.01)

(58) Field of Classification Search
CPC ..... E01C 7/18; E01C 7/30; E01C 7/32; E01C 7/325; E01C 7/185; E01C 11/02; E01C 11/24; C08K 3/013; C08K 3/36; C08K 5/09; C08K 2003/2227; C08L 91/06; C08L 93/00; C08L 95/00; C08L 101/12; C08L 2555/50; C08L 2555/60; C08L 2555/80; C08L 2555/84
USPC ............................ 404/17, 27, 28, 31, 72, 75
See application file for complete search history.

(56) References Cited

U.S. PATENT DOCUMENTS

| | | |
|---|---|---|
| 1,341,458 A | 5/1920 | Finley |
| 1,411,777 A | 4/1922 | Everett |
| 2,076,172 A | 4/1937 | Bowden |
| 2,330,568 A | 5/1941 | Erickson |
| 2,821,890 A | 7/1958 | Wilson |
| 3,259,122 A | 7/1966 | Lenker |
| 3,763,074 A | 10/1973 | Rostler |
| 3,870,426 A | 3/1975 | Kietzman |
| 4,113,401 A | 9/1978 | McDonald |
| 4,181,449 A | 1/1980 | Lenker |
| 4,327,666 A | 5/1982 | Lee |
| 4,462,547 A | 7/1984 | Met |

(Continued)

FOREIGN PATENT DOCUMENTS

| | | |
|---|---|---|
| CN | 1834160 A | 9/2006 |
| CN | 102154975 A | 8/2011 |

(Continued)

OTHER PUBLICATIONS

Anonymous: "Polyguard Pavement Underseal and Waterproofing Membranes", XP-055289880, Ennis, TX 75120-0755, USA, dated May 23, 2016, Retrieved from Internet: URL:http://www.polyguardproducts.com/products/highway/datasheets/665_NW-75.pds [retrieved on Jul. 20, 2016] (pp. 1-4).

(Continued)

*Primary Examiner* — Raymond W Addie
(74) *Attorney, Agent, or Firm* — Brinks Gilson & Lione

(57) ABSTRACT

A roadway structure that includes: a substrate; a hot mix application portion positioned over the substrate, wherein said hot mix application portion comprises first and second adjacent paving passes defining a longitudinal joint, and wherein the first and second adjacent paving passes contain air voids along the longitudinal joint; and a spray-applied band of void reducing joint composition positioned between the substrate and the hot mix application portion, wherein the band is below the longitudinal joint, and wherein at least at portion of the void reducing joint composition fills at least some of the air voids.

12 Claims, No Drawings

(56) References Cited

U.S. PATENT DOCUMENTS

| | | |
|---|---|---|
| 4,464,427 A | 8/1984 | Barlow |
| 4,511,283 A | 4/1985 | Duval et al. |
| 4,511,284 A | 4/1985 | Sterner |
| 4,592,507 A | 6/1986 | Benedict |
| 4,630,965 A | 12/1986 | Nguyen et al. |
| 4,678,363 A | 7/1987 | Sterner |
| 4,682,909 A | 7/1987 | Mihara |
| 4,817,870 A | 4/1989 | Dalton |
| 5,026,609 A | 6/1991 | Jacob |
| 5,051,026 A | 9/1991 | Sovik |
| 5,088,854 A | 2/1992 | Sovik |
| 5,131,788 A | 7/1992 | Hulicsko |
| 5,232,306 A | 8/1993 | Sterner |
| 5,263,790 A | 11/1993 | Bickley |
| 5,297,893 A | 3/1994 | Corcoran |
| 5,333,969 A | 8/1994 | Blaha et al. |
| 5,362,176 A | 11/1994 | Sovik |
| 5,419,654 A | 5/1995 | Kleiger |
| 5,439,313 A | 8/1995 | Blaha et al. |
| 5,549,457 A | 8/1996 | Flores |
| 5,773,496 A | 6/1998 | Grubba |
| 5,795,929 A | 8/1998 | Grubba |
| 5,851,085 A | 12/1998 | Campbell |
| 5,895,173 A | 4/1999 | O'Brien et al. |
| 5,957,621 A | 9/1999 | Clark, Jr. et al. |
| 5,981,061 A | 11/1999 | Hegemann |
| 6,079,901 A | 6/2000 | Banks et al. |
| 6,089,785 A | 7/2000 | Bergman |
| 6,113,309 A | 9/2000 | Hollon |
| 6,382,523 B1 | 5/2002 | Hedegard |
| 6,776,557 B2 | 8/2004 | Barnat et al. |
| 6,802,464 B2 | 10/2004 | Marconnet |
| 6,805,516 B2 | 10/2004 | Barnat et al. |
| 6,918,714 B2 | 7/2005 | Chambard |
| 7,438,764 B1 | 10/2008 | Hill |
| 7,448,825 B2 | 11/2008 | Kasahara et al. |
| 7,448,826 B2 | 11/2008 | Laury |
| 7,488,138 B2 | 2/2009 | Buschmann |
| 7,503,715 B2 | 3/2009 | Blacklidge |
| 7,503,724 B2 | 3/2009 | Blacklidge |
| 7,572,081 B2 | 8/2009 | Buschmann |
| 7,798,744 B2 | 9/2010 | Larson et al. |
| 7,927,038 B2 | 4/2011 | Dawson |
| 7,972,429 B2 | 7/2011 | Crews |
| 8,021,076 B2 | 9/2011 | Hoppe |
| 8,329,250 B2 | 12/2012 | Exline |
| 8,439,597 B2 | 5/2013 | Diamond |
| 8,465,224 B2 | 6/2013 | Price et al. |
| 8,702,342 B2 | 4/2014 | Price et al. |
| 8,740,498 B2 | 6/2014 | Velicky |
| 8,764,340 B2 | 7/2014 | Campbell |
| 8,968,457 B2 | 3/2015 | Payne |
| 9,416,503 B1 | 8/2016 | Sargent |
| 9,435,084 B2 | 9/2016 | Bartoszek |
| 9,567,716 B2 | 2/2017 | Rainwater |
| 9,784,843 B2 | 10/2017 | Dolinar |
| 2003/0226290 A1 | 12/2003 | Savard |
| 2007/0199476 A1* | 8/2007 | Bobee ............... C08L 95/00 106/275 |
| 2008/0008525 A1 | 1/2008 | Dawson |
| 2009/0097918 A1 | 4/2009 | Larson |
| 2010/0127106 A1 | 5/2010 | Fornasier |
| 2010/0143035 A1 | 6/2010 | Dawson |
| 2011/0166266 A1 | 7/2011 | Dawson |
| 2011/0206455 A1* | 8/2011 | Blacklidge ............ E01C 7/185 404/17 |
| 2011/0313088 A1 | 12/2011 | Binkley |
| 2012/0219359 A1 | 8/2012 | Baltus |
| 2014/0112717 A1 | 4/2014 | Yu et al. |
| 2014/0219722 A1 | 8/2014 | Velicky |
| 2014/0353394 A1 | 12/2014 | Foster |
| 2014/0363231 A1 | 12/2014 | Bartoszek |
| 2016/0208098 A1 | 7/2016 | Naidoo |
| 2016/0265169 A1 | 9/2016 | Kriech et al. |
| 2016/0355999 A1 | 12/2016 | Bartoszek |
| 2017/0356136 A1 | 12/2017 | Kreich |

FOREIGN PATENT DOCUMENTS

| | | |
|---|---|---|
| CN | 202509377 U | 10/2012 |
| CN | 203625779 U | 6/2014 |
| CN | 203795278 U | 8/2014 |
| DE | 1 534 429 A1 | 9/1969 |
| EP | 0643171 A1 | 3/1995 |
| FR | 818 518 A | 9/1937 |
| FR | 843 987 A | 7/1939 |
| GB | 2 420 144 A | 5/2006 |
| WO | WO 2007/018362 A1 | 2/2007 |

OTHER PUBLICATIONS

Anonymous: "Rehabilitation of Concrete Pavements with Polyguard NW-75 Prior to Asphalt Overlay", XP055289887, Retrieved from Internet: URL:http://www.polyguardproducts.com/products/highway/concreterehab.htm [retrieved on Jul. 20, 2016], May 23, 2016 (pp. 1-3).

"Asphalt Swan Hill—Rolling & Joint heating Asphalt Video 4.mov", Apr. 15, 2011, https://www.youtube.com/watch?v=4Hz5zrqdqUw.

Brown, Harry E., "Joint Sealant Materials for Concrete Pavement Repairs", *Virginia Transportation Research Counsel*, Jan. 1991, (pp. 179-220).

Buncher, Mark, Ph.D., P.E., "Best Practices for Asphalt Longitudinal Joints", Asphalt Institute, *National Pavement Preservation Conference*, Aug. 29, 2012, (60 pages).

"Carlson Joint Density Attachments (Compaction)", Jan. 28, 2015, https://www.youtube.com/watch?v=xoUmBnS6J8w.

Chinese Office Action from corresponding Chinese application No. 201610137273X dated May 31, 2019 (16 pages).

"Colorado DOT Distress Manual for HMA and PCC Pavements . . . Pavement Preservation",*National Center for Pavement Preservation*, Oct. 2004, (51 pages).

"Comprehensive Pavement Design Manual", *Chapter 8—Pavement Joints*, Revision 1, Jul. 2, 2002, (8 pages).

Concrete Paving Technology, "Joint and Crack Sealing and Repair for Concrete Pavements", *American Concrete Pavement Association*, 1995, (32 pages).

"Construction and Materials Manual", *Wisconsin Department of Transportation*, Chapter 4, Section 21, Jul. 2013, (3 pages).

DeVries, Jeff et al., "Iowa DOT Hardin County SR 57", Oct. 19, 2016 (6 pgs).

Duval, John, P.E., "Best Practices for HMA Joint Construction", Idaho Asphalt Conference, *SemMaterials*, Oct. 25, 2007, (10 pages).

Eacker, Michael J., et al., Evaluation of Various Concrete Pavement Joint Sealants, Michigan Department of Transportation MDOT, Testing and Research Section, Construction and Technology Division, Work Plan No. 137, Research Project G-0300, Research Report No. R-1376, May 2000, (19 pages).

European extended Search Report from corresponding European application No. 16159379.3 dated Aug. 2, 2016 (14 pgs).

European extended Search Report from corresponding European application No. 16159499.9 dated Sep. 16, 2016 ((9 pgs).

European extended Search Report from corresponding European application No. 17198070.9 dated Feb. 27, 2018 (9 pgs).

Fowler, David W., et al., Pavement Repair Guidelines for Longitudinal Joints, *Center for Transportation Research, The University of Texas at Austin*, CTR Technical Report 5-5444-01-1, Nov. 2010, (66 pages).

"Guide for Design and Construction of New Jointed Plain Concrete Pavements (JPCPs)", *Division of Design, Office of Pavement Design, Pavement Design & Analysis Branch*, Jan. 9, 2008, (37 pages).

Hailesilassie Biruk W. et al., "Testing of blister propagation and peeling of orthotropic bituminous waterproofing membranes", *Materials and Structures*, London, GB, vol. 48, No. 4, Nov. 21, 20163 (pp. 1095-1108).

"Heat Design Equipment—Joint Asphalt Repair", Dec. 14, 2009, https://www.youtube.com/watch?v=n1xb5y9lIAU.

(56) References Cited

OTHER PUBLICATIONS

"Illinois DOT Longitudinal Joint Study 2012", Feb. 20, 2016, https://www.youtube.com/watch?v=JnMpX7QR1h8.
Iowa DOT: Jeff DeVries & Mark Doug, "Iowa DOT Hardin County SR 57", Prime Contractor: Mannatt's Inc., Applicator: Road Fabrics Inc., Iowa DOT Report dated Oct. 19, 2016 (6 pgs).
"J Band Void Reducing Asphalt Membrane", Mar. 2, 2018, https://www.youtube.com/watch?v=v8zlMY9thu8.
"J-Band Results", *J-Band*, https://www.thejointsolution.com/results/.
"Joint and Crack Maintenance", Division 4—CW3250—R7, Dec. 2008, (4 pages).
"Jointbond Asphalt Longitudinal Joint Stabilizer 2", Jan. 11, 2018, https://www.youtube.com/watch?v=OsEHtcSseX0.
Jung, Youn su, et al., "Best Practices of Concrete Pavement Transition Design and Construction," *Texas Transportation Institute*, , Report 0-5320-1, Oct. 2006, (91 pages).
Kandhal, Prithvi S., et al., "Longitudinal Joint Construction Techniques for Asphalt Pavements", *NCAT Report No. 97-4*, Aug. 1997, (26 pages).
Kandhal, Prithvi S., et al., Evaluation of Various Longitudinal Joint Construction Techniques for Asphalt Airfield Pavements, *Presented at 2007 FAA Worldwide Airport Technology Transfer Conference*, Apr. 2007, (18 pages).
Kuennen, Tom, "Correcting Problem Concrete Pavements", *Road Science*, May 2003, (pp. 32-38).
"Longitudinal Joint Construction Best Practices", *Flexible Pavements of Ohio Field Operations Committee*, Feb. 18, 2015, (1 page).
"Longitudinal Joint Tack", May 20, 2016, https://www.youtube.com/watch?v=_1jsoTagyxQ.
Mallick, Rajib B., et al., "Project 04-05: Improved Performance of Longitudinal Joints on Asphalt Airfield", *Airfield Asphalt Pavement Technology Program (AAPTP)*, Dec. 20, 2007, (162 pages).
McDaniel, Rebecca S., , A. Shah, and J. Olek, "Longitudinal Joint Specifications and Performance", Publication FHWA.IN/JTRP-2012/29, Joint Transportation Research Program, Indiana Dept. of Transportation and Purdue University, West Lafayette, Indiana, 2012 (2 pgs).
"Pavement Design Manual", *Ohio Department of Transportation Office of Pavement Engineering*, Jul. 2014, (109 pages).
"Pavement Joint Adhesive", *S-1 (2331) Pavement Joint Adhesive*, Sep. 2, 2010, (2 pages).
"Pavement Preservation Guidelines", *South Dakota Department of Transportation*, Feb. 2010 (79 pages).
"Rigid pavement Joint Sealant", Oct. 3, 2016, https://www.youtube.com/watch?v=tEdhOmQIZwo.
Scherocman, James A., "Construction of Durable Longitudinal Joints", Sep. 1, 2008 (63 pages).
"Schmidt Construction cutting longitudinal Joint with Wheel", Sep. 18, 2014, https://www.youtube.com/watch?v=2j9n5AdNk8k.
"Smooth Racetrack Reconstruction", *Asphalt Contractor Staff*, Oct. 1, 2004, https://www.forconstructionpros.com/pavement-maintenance/preservation-maintenance/planers-milling-machines/article/10306788/smooth-racetrack-reconstruction.
Sorensen E.V., "Protecting Bridge Reinforcement", *Concrete Engineering International, Concrete Society*, Camberley, GB, vol. 6, No. 3, Sep. 1, 2002 (p. 58).
"Standard Practice for Sealing Joints and Cracks in Rigid and Flexible Pavements", *Unified Facilities Criteria (UFC)*, UFC 3-250-08FA, Jan. 16, 2004 (55 pages).
Thompson, Vern, "The Use of Asphalt Rubber for Crack Sealing in Asphalt Concrete Pavements and for Joint Sealing in Portland Cement Concrete Pavements", *For Presentation at the "Third" National Seminar on Asphalt Rubber*, Oct. 30-31, 1989 (30 pages).
U.S. Office Action from corresponding U.S. Appl. No. 15/064,814 dated Mar. 15, 2017 (12 pages).
U.S. Office Action from corresponding U.S. Appl. No. 15/401,990 dated Mar. 16, 2017 (19 pages).
U.S. Office Action from corresponding U.S. Appl. No. 15/401,990 dated Jun. 29, 2017 (18 pages).
U.S. Office Action from corresponding U.S. Appl. No. 15/064,814 dated Jun. 29, 2017 (19 pages).
U.S. Office Action from corresponding U.S. Appl. No. 15/646,912 dated Sep. 12, 2017 (10 pages).
U.S. Final Office Action from corresponding U.S. Appl. No. 15/787,427 dated Feb. 14, 2018 (7 pages).
U.S. Office Action from corresponding U.S. Appl. No. 15/064,814 dated Mar. 15, 2018 (15 pages).
U.S. Office Action from corresponding U.S. Appl. No. 15/787,427 dated Jul. 20, 2018 (8 pages).
U.S. Final Office Action from corresponding U.S. Appl. No. 15/064,814 dated Aug. 8, 2018 (22 pgs).
U.S. Office Action from corresponding U.S. Appl. No. 15/064,814 dated Jan. 22, 2019 (11 pages).
U.S. Office Action from corresponding U.S. Appl. No. 15/787,427 dated Feb. 21, 2019 (12 pages).
U.S. Office Action from corresponding U.S. Appl. No. 16/276,214 dated Mar. 15, 2019 (14 pages).
U.S. Office Action from corresponding U.S. Appl. No. 16/103,466 dated Mar. 19, 2019 (14 pages).
U.S. Office Action from corresponding U.S. Appl. No. 15/787,427 dated Jun. 18, 2019 (11 pages).
Williams, R. Christopher, et al, "Quality Control/Quality Assurance Testing for Joint Density and Segregation of Asphalt Mixtures", *Iowa State University*, Apr. 2013, (68 pages).
Huang, Baoshan et al., "Evaluation of Longitudinal Joint Construction Techniques for Asphalt Pavements in Tennessee", *Journal of Materials in Civil Engineering*, Nov. 2010 (11 pgs).
Kim, Eric Mu-Young, "Evaluation of Asphalt Longitudinal Joint Construction and Practices in South Carolina", *All Theses. 2735—A Thesis Presented to the Graduate School of Clemsen University*, Aug. 2017 (194 pgs).
Mallela, Jagannath et al., "Evaluation of Longitudinal Joint Tie Bar System", *Colorado Dept. of Transportation—DTD Applied Research & Innovation Branch*, Final Report No. CDOT-2011-12, Sep. 2011 (117 pgs).
McDaniel, Rebecca S. et al., "Longitudinal Joint Specifications and Performance", *Joint Transportation Research Program, Indiana Dept. of Transportation and Purdue University*, Publication FHWA/IN/JTRP-2012/29, 2012, (54 pgs).
NRRA Flexible Team, "Longitudinal Joint Construction", *National Road Research Alliance*, Sep. 2018 (19 pgs).
Shanley, Laura, "Development and Evaluation of Longitudinal Joint Sealant in Illinois", Physical Research Rept. No. 168, Apr. 2019 (65 pgs).
Williams, Stacy G., "HMA Longitudinal Joint Evaluation and Construction", *University of Arkansas, Dept. of Engineering*, Final Report TRC-0801, Feb. 2011 (90 pgs).

* cited by examiner

VOID REDUCING ASPHALT MEMBRANE COMPOSITION, METHOD AND APPARATUS FOR ASPHALT PAVING APPLICATIONS

RELATED APPLICATIONS

The present application is a continuation of U.S. Non-Provisional application Ser. No. 16/276,214, filed Feb. 14, 2019, which is a continuation of U.S. Non-Provisional application Ser. No. 16/103,466, filed Aug. 14, 2018, which is continuation of U.S. Non-Provisional patent application Ser. No. 15/646,912, filed Jul. 11, 2017, which is a continuation of U.S. Non-Provisional application Ser. No. 15/401,995, filed Jan. 9, 2017, which is a continuation of U.S. Non-Provisional patent application Ser. No. 15/064,819, filed Mar. 9, 2016 which is based upon U.S. Provisional Application Ser. No. 62/130,293, filed Mar. 9, 2015 and 62/302,335 filed Mar. 2, 2016 to each non-provisional and provisional applications priority is claimed under 35 U.S.C. § 120 and of each of which the entire disclosures are hereby expressly incorporated by reference.

TECHNICAL FIELD

The present invention relates to installation and preventive maintenance of asphalt paved surfaces. More particularly the present invention relates to void reducing asphalt membrane compositions and methods for bonding and reducing voids in longitudinal asphalt pavement construction joints in a variety of paved surface construction joint applications and equipment/apparatus for applying a void reducing asphalt membrane beneath or on the vertical face of longitudinal asphalt pavement construction joints.

BACKGROUND ART

The cracking of longitudinal asphalt pavement construction joints is a common pavement distress associated with asphalt pavements. When an asphalt pavement is constructed the width of the pavement is limited by the width of the screed or screed extensions. This width can vary from 8 feet to a maximum of about 35 feet in special cases. Pavement widths that are greater than the maximum screed width require the formation of a longitudinal asphalt pavement construction joint where the hot mix asphalt is paved against the edge of previously laid portion of the pavement. In many situations, the reconstruction of roadways may not allow for full closure to traffic. In such situations which are typical, paving width is limited to one lane (normally 12 feet or 3.6 meters wide) while vehicular traffic is redirected onto an adjacent pavement. This limitation forces the next lane to be placed against the first pavement forming a longitudinal asphalt pavement construction joint between the lanes.

There are a number of deficiencies that are associated with longitudinal asphalt pavement construction joints. For example, the unconfined edges of a first pass of the pavement cannot be compacted to the same degree that the center of the first pass is compacted. Compaction increases density and reduces air voids which are critical to the performance of asphalt pavements. After the first pass is completed an adjacent pass places a hot paving mixture against the now cold first paving pass, creating a longitudinal asphalt pavement construction joint between the two paving passes or lanes.

As a result, the area along the longitudinal asphalt pavement construction joint is higher in air voids, creating permeability to air and water causing the joint to be subject to oxidization and aging more rapidly than the rest of the pavement. The area along the longitudinal asphalt pavement construction joint can be a foot in width where the air voids are higher than the area in the middle of the paving lane. In areas where freeze/thaw occurs, water can intrude into the permeable joint and adjacent area and freeze. As these events occur, the joint becomes significantly weaker than the rest of the pavement, resulting in a greater tendency for the joint to crack from heating and cooling (expansion and contraction) of the adjacent pavement.

Once cracks form along longitudinal asphalt pavement construction joints they allow more water and air to penetrate into the underlying layers of the pavement, causing more damage to the joint and underlying pavement layers. This accelerates the development of fatigue cracks radiating outward from longitudinal cracks which often widens the longitudinal cracks and accelerates the overall damage to the pavement structure.

The initiation of longitudinal asphalt pavement construction joint cracks is caused by the shrinkage of asphalt surface due to pavement heating and cooling cycles from day to night and summer to winter. The cracking occurs at the longitudinal asphalt pavement construction joint because the density of the joint is lower than the rest of the pavement causing a weak bond to be formed. The joint has the lowest tensile strength in the pavement and fails first when the pavement contracts as it cools. A second factor in longitudinal asphalt pavement construction joint cracking is oxidative hardening of the asphalt due to high air voids in the mixture in the joint area which makes that material particularly susceptible to cracking and subsequent raveling. The asphalt mixture adjacent to the longitudinal asphalt pavement construction joint cracking is exposed to air and water intrusion which can lead to poor adhesion between the asphalt and aggregate, which further causes more rapid deterioration (raveling). During early stages, these cracks are usually repaired by sealing. After raveling begins to develop, the repair is more extensive, since the materials adjacent to the crack must be removed and replaced. These maintenance activities are labor intensive and create safety concerns for the maintenance crews since they are usually performed when the pavement is under traffic conditions. This also causes traffic delays for the motoring public.

Longitudinal asphalt pavement construction joint cracking and subsequent raveling degrade pavement serviceability, shorten pavement life and increase life cycle cost. Therefore the reduction or elimination of longitudinal asphalt pavement construction joint cracking results in reduced life cycle costs and increased pavement life.

There are two primary approaches that have been traditionally used to delay longitudinal asphalt pavement construction joint cracking problems. One approach is to make the joint stronger than the adjoining material so that the pavement will not fail at the joint under temperature expansion/contraction. Joint compaction techniques are attempts to prevent cracking in this manner. The second approach to crack prevention is to put very elastic pliable material into the joint during the pavement construction. When this method is used, as the pavement contracts, the joint material simply flows to release the stress.

Mechanical devices have been developed which are intended to compact the unconfined edge of pavement or cut the high air void edge from the pavement. In practice, this approach has not solved the problem of creating a strong joint which lasts as long as the pavement.

Other approaches involve providing an elastic pliable material in the form of a tape at the pavement joint. This tape is placed against a cold longitudinal asphalt pavement construction joint of the pavement. Before use, the joint is cleaned so as to be free of dirt and unbonded material. The edge of the joint tape is then applied to be flush with the surface of the pavement. Next, the non-stick release paper is removed and the placement of the adjacent pavement section is completed. Once the hot mix asphalt is placed against the tape, the tape melts, binding the joint together.

Comparison between pavements installed with joint tape and those installed without a joint tape indicate that the joint tape provides a joint that lasts longer before cracking. The air void content at the immediate area of the joint are reduced and therefore, the joints are less permeable to water. While the joint tape can help address the bond between the adjacent pavement layer and reduce the air voids at the immediate joint face, it fails to address the higher air voids up to a foot away from the joint. Another deficiency of joint tape is the high labor to physically prepare/clean the area and install the material Studies conducted on highways on a life cycle basis find that pavements in the northern part of the United States develop longitudinal asphalt pavement construction joint cracking within 2 to 3 years after placement of hot mix asphalt. The current treatment strategy is to crack fill the joint with a standard polymerized asphalt or crumb rubber asphalt. The problem is that this topical treatment does not treat the damage caused by water which reaches further into the pavement prior to treatment. Highway departments find that current treatment protocols only last 3 to 4 years after which the crack fill is repeated. Ordinarily pavements currently last 13 years on average. This relatively short 13 year life often is due to damage near the longitudinal asphalt pavement construction joint.

The present invention provides void reducing asphalt membrane compositions and placement that overcome many of the disadvantages associated with known joint materials and installation techniques.

DISCLOSURE OF THE INVENTION

According to various features, characteristics and embodiments of the present invention which will become apparent as the description thereof proceeds, the present invention provides for void reducing asphalt membrane compositions that can be placed in a band on an existing pavement surface that defines the first substrate in the area where the new longitudinal joint(s) will be constructed. The band of void reducing asphalt membrane is wide enough to be beneath the area of the new pavement lift that is typically low in density, high in air void volume. The band of void reducing asphalt membrane is in sufficient thickness to allow migration into the new asphalt mixture lift overlay and reduce the air void volume and ability for water to infiltrate and damage the new asphalt mixture overlay and underlying structure. The band of void reducing asphalt membrane can be driven over by the construction equipment or the traveling public and not be displaced or picked up on tires/tracks and removed from its intended location. The band of void reducing asphalt membrane will not flow laterally from its intended placement location. The void reducing asphalt membrane will adhere to the existing pavement surface, whether it is asphalt concrete, Portland cement concrete, milled asphalt concrete or Portland cement concrete, brick or chip seal surface, etc. The void reducing asphalt membrane composition generally comprises a mixture of asphaltic binder, elastomeric polymers, thickener and additive to reduce tackiness.

The present invention provides a method of forming a pavement construction joint, comprising:

dispensing a band of a void reducing joint composition on a substrate using at least one spray application vehicle, wherein the band comprises a width of about 4 to about 24 inches;

permitting the application of a paving pass over the band of joint composition, wherein the paving pass is positioned against an edge of a previously laid portion of pavement to form a pavement construction joint having a volume of air voids; and allowing at least a portion of the joint composition to migrate upward to reduce the volume of air voids.

BEST MODE FOR CARRYING OUT THE INVENTION

The present invention is directed to a new preventative maintenance product and process for pavement construction involving hot mix asphalt and particularly to the construction of joints between adjacent pavements and non-asphaltic surfaces such as concrete.

The present invention provides void reducing asphalt membrane compositions which, when used in pavement applications, are placed below the new lift of asphalt mixture pavement and/or against a cold joint on the vertical face of a newly created lift of asphalt mixture pavement before an adjacent hot mix is put down against or over the cold joint to form a good bond between the cold joint and hot mix and reduce air voids and water permeability and create better crack resistance in the area of the joint. The void reducing asphalt membrane compositions of the present invention have been formulated so as to be resistant to lateral flow prior to paving over with hot mix asphalt in order to remain in the joint area in sufficient quantity to fill voids. At the same time the void reducing asphalt membrane composition is formulated so that it can be applied in a sufficient thickness to allow it to migrate upward into a freshly placed asphalt overlay during a paving process to reduce air voids and reduce water permeability. In multi-pass pavement applications the void reducing asphalt membrane composition can be provided between adjacent passes of asphalt, including on the vertical face or edge of a first or previous pass. Further a conventional tack coating can be provided under a first or previous pass alone or together with a band of the void reducing asphalt membrane composition.

The void reducing asphalt membrane composition is sufficiently non-tracking or loses its tackiness quickly so as to allow for construction traffic to drive over the applied composition during placement of an asphalt overlay or an adjacent pass and avoid work stoppage during a paving operation. Generally after application the void reducing asphalt membrane composition may be driven across by construction traffic or other vehicular traffic within 30 minutes of placement or as within as little as 15 minutes or less of placement. This ability to be non-tracking or quickly lose any tackiness solves constructability issues that plague other approaches to pavement joint construction.

The composition includes polymerized asphalt which allows a joint formed therefrom to expand and contract elastically, thus dissipating expansion and contraction forces. The highly compliant material behaves like an expansion joint in pavement applications which prevents stresses from building up at the joint which would otherwise tend to cause cracks to form and subsequent pavement failure.

The void reducing asphalt membrane composition of the present invention generally comprises a mixture of an asphalt binder, elastomeric polymers, a thickener and a wax modifier. Other embodiments comprise an asphalt binder, elastomeric polymers, a thickener, a wax modifier and fumed silica and/or fumed alumina. Further embodiments include an asphalt binder, elastomeric polymers, a thickener, a wax modifier and a saponified fatty acid and a resin acid gelling compound. Still further embodiments comprise an asphalt binder, elastomeric polymers, a thickener, a wax modifier fumed silica and/or fumed alumina and a saponified fatty acid and a resin acid gelling compound.

The asphalt binder is the main component of the composition and provides the material strength or foundation to fill voids in the area of the longitudinal asphalt pavement construction joint. The asphalt binder can comprise 85 to 97 wt. % of the composition and more preferably 90 to 93 wt. % of the composition. Suitable asphalt binders include paving grade asphalts including; performance graded, viscosity graded or/or penetration graded.

The composition includes an elastomeric polymer component that allows the area in and around the longitudinal asphalt pavement construction joint formed therefrom to expand and contract elastically. The polymer component creates a polymer modified asphalt binder in combination with the asphalt binder component. Suitable examples of this polymer component include Styrene-Butadene-Styrene (SBS), Styrene-Butadene Rubber (SBR), Ethylene-Styrene-Interpolymers (ESI), Evaloy (an ethylene terpolymer available from Dupont), and other elastomeric polymers that are used in polymer modified asphalt compositions. This polymer component can comprise 1 to 6 wt. % of the composition and more preferably 2 to 5 wt. % of the composition.

The wax modifier reduces the viscosity of the composition at the paving temperature so that during a paving process the composition can migrate upward into a freshly placed asphalt overlay to reduce air voids and reduce water permeability. Furthermore, at pavement surface temperature, the wax modifier provides stiffness to the void reducing asphalt membrane which reduces issues with tracking. Suitable wax modifiers include, but are not limited to, waxes of vegetable (e.g. carnuba wax), animal (e.g. beeswax) mineral (e.g. Montan™ wax from coal, Fischer Tropsch wax from coal) or petroleum (e.g. paraffin wax, polyethylene wax, Fischer-Tropsch wax from gas) origin including oxidised waxes; amide waxes (e.g. ethylene bis stearamide, stearyl amide, stearylstearamide); fatty acids and soaps of waxy nature (e.g. aluminum stearate, calcium stearate, fatty acids). The wax modifier also improves cohesion properties of the composition. The wax modifier can comprise 1 to 5 wt. % of the composition and more preferably 2 to 4 wt. % of the composition.

The fumed silica and/or fumed alumina function as fillers and impart resistance to flow immediately after application and give a non-tacky character to the composition that prevents pick-up by construction and non-construction equipment before paving is complete.

The fumed silica and fumed alumina can be used alone or together in any desired proportion. The total amount of fumed silica and/or fumed alumina can comprise 1 to 10 wt. % of the composition and more preferably 3 to 6 wt. % of the composition.

The saponified fatty acid and resin acid gelling compound functions to control the rate at which the composition sets or cures. Suitable saponified fatty and resin acid gelling compounds include but are not limited to crude tall or distilled tall oil. The total amount of saponified fatty acid and resin acid gelling compound can comprise 0 to 3 wt. % of the composition and more preferably 1 to 2 wt. % of the composition.

A typical formulation of the void reducing asphalt membrane composition is made by adding the polymer component to the heated asphalt binder while shearing the mixture. After or before the polymer component and asphalt binder are thoroughly mixed the wax modifier can be added while shearing the mixture followed by the addition of the fumed silica and/or fumed alumina are and saponified fatty acid and resin acid gelling compound. The mixed void reducing asphalt membrane should be stored under conditions of agitation and heating until application.

During the course of the present invention the inventors discovered that when the final polymer composition included fumed silica and/or fumed alumina the resulting polymer composition demonstrated improved heat stability. Furthermore the polymer properties imparted to the composition remained more consistent over time while at an elevated temperature as compared to a similar composition that did not include fumed silica and/or fumed alumina.

In a typical application the void reducing asphalt membrane composition of the present invention is placed in a band from 4 to 24 inches wide on the surface to be paved (also referred to as a cold joint portion) in the area where a longitudinal construction joint of an asphalt overlay or pass will develop. Subsequently the asphalt overlay or pass is laid down. In the case of multi-pass pavement installations before an adjacent paving pass is placed, a band of the void reducing asphalt membrane composition having a width of 4 to 24 inches is applied over and against the vertical face portion of a previously laid pavement pass in the area where the longitudinal joint will occur under the adjacent paving pass. The thickness of applied band of void reducing asphalt membrane compound in any situation can be ⅟16 to ⅜ of an inch depending on the overlay type and thickness. These widths and thickness ranges are exemplary of typical applications; however, it is to be understood that other widths and thicknesses and combinations thereof could be used. The thickness of the applied band can be adjusted to allow migration of a volume of the void reducing asphalt membrane composition into the asphalt overlay and reduce the air void volume and ability for water to infiltrate and damage the overlay and underlying structure. The band of void reducing asphalt membrane composition can be applied to any existing surface to be paved including asphalt concrete, Portland cement concrete, milled asphalt concrete or milled Portland cement concrete, brick or a chip seal surface as well as metal structures.

For paving of adjacent lanes the void reducing asphalt membrane composition can be applied to the vertical face of the first paving pass as well as on an area where the second application of the product as described above will be placed.

The air void volume in the finished asphalt overlay in the area of the longitudinal asphalt pavement construction joint above the void reducing asphalt membrane composition can be reduced to about 7% or lower due to the migration of the product into the finished asphalt overlay. In preferred embodiments the air void volume of the finished asphalt overlay will be reduced to 4% in the finished asphalt overlay in the area above the void reducing asphalt membrane composition.

In the area of the longitudinal asphalt pavement construction joint the asphalt overlay mixture will be of low permeability to water infiltration as a result of the void reducing asphalt membrane composition migration into the asphalt overlay. The area of the longitudinal asphalt pavement construction joint over the void reducing asphalt membrane composition will be resistant to crack initiation and propagation.

The void reducing asphalt membrane composition can be applied using various coating methods such as coating, rolling, spraying, etc. According to one embodiment of the present invention the void reducing asphalt membrane composition can be applied using a strike off box that may be mounted on mobile equipment that can be pulled or pushed either manually or mechanically driven. Strike off boxes that are designed for use in narrow width paving projects are exemplified by U.S. Pat. No. 8,506,204 to Reames et al. incorporated herein by reference. Alternatively conventional paving equipment downsized to apply the void reducing asphalt membrane composition in desired widths can be used.

In other embodiments a spraying system can be used which can be mounted on mobile equipment that can be pulled or pushed either manually or mechanically driven. Otherwise the spraying can be achieved using a handheld spraying device such as a wand.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and encompassed by the attached claims.

What is claimed is:

1. A roadway structure comprising:
   a substrate;
   a hot mix application portion positioned over the substrate, wherein said hot mix application portion comprises first and second adjacent paving passes defining a longitudinal joint, and wherein the first and second adjacent paving passes contain air voids along the longitudinal joint; and
   a spray-applied band of void reducing joint composition positioned between the substrate and the hot mix application portion, wherein the band is below the longitudinal joint, and wherein at least at portion of the void reducing joint composition fills at least some of the air voids.

2. The structure of claim 1, wherein the substrate comprises a pre-existing pavement roadway.

3. The structure of claim 1, wherein the void reducing joint composition comprises at least one asphaltic binder, at least one elastomeric polymer, at least one thickener, and at least one additive to reduce tackiness.

4. The structure of claim 1, wherein the substrate comprises at least one of an asphalt concrete, a cement concrete, a milled asphalt concrete, a brick surface, or a chip seal surface.

5. The structure of claim 1, wherein the substrate comprises a milled asphalt concrete.

6. The structure of claim 1, wherein the band of void reducing joint composition comprises a width of about 4 to about 24 inches.

7. The structure of claim 1, wherein the void reducing joint composition consists essentially of at least one asphaltic binder, at least one elastomeric polymer, at least one thickener, and at least one additive to reduce tackiness.

8. The structure of claim 7, wherein the at least one elastomeric polymer comprises a styrene-butadiene-styrene polymer.

9. The structure of claim 7, wherein the joint composition comprises about 85 to about 97 wt. % of the least one asphalt binder.

10. The structure of claim 1, prepared by a process that includes dispensing the band of void reducing joint composition on the substrate using at least one spray application vehicle.

11. The structure of claim 10, wherein the band of void reducing joint composition comprises a width of about 4 to about 24 inches.

12. The structure of claim 11, wherein the band of void reducing joint composition is non-tracking.

* * * * *